United States Patent [19]

Fasciano et al.

[11] Patent Number: 5,715,018
[45] Date of Patent: Feb. 3, 1998

[54] DIGITAL ADVERTISEMENT INSERTION SYSTEM

[75] Inventors: Peter J. Fasciano, Natick; Paul D. Garmon, Winchester; Eric C. Peters, Carlisle, all of Mass.

[73] Assignee: Avid Technology, Inc., Tewksbury, Mass.

[21] Appl. No.: 866,848

[22] Filed: Apr. 10, 1992

[51] Int. Cl.$^6$ .................... H04N 5/222; H04N 7/10; H04N 9/475

[52] U.S. Cl. .................. 348/722; 348/6; 348/514; 348/547

[58] Field of Search ........................ 358/185, 142, 358/86; 348/722, 720, 721, 460, 5, 3, 1, 9, 8, 7, 6, 505, 506, 510, 512, 514, 536, 549; 455/3.1, 4.1; H04N 5/222, 7/10, 9/475

[56] References Cited

U.S. PATENT DOCUMENTS

| | | | |
|---|---|---|---|
| 2,927,154 | 3/1960 | Wolfe et al. | 178/6.6 |
| 3,084,215 | 4/1963 | Bounsall | 178/6.6 |
| 3,721,757 | 3/1973 | Ettlinger | 178/6.6 |
| 4,193,085 | 3/1980 | Imamura | 348/505 |
| 4,295,154 | 10/1981 | Hata et al. | 348/6 |
| 4,580,165 | 4/1986 | Patton et al. | 348/505 |
| 4,635,136 | 1/1987 | Ciampa et al. | 358/342 |
| 4,667,802 | 5/1987 | Verduin et al. | 194/217 |
| 4,675,755 | 6/1987 | Baumeister et al. | 360/35.1 |
| 4,724,491 | 2/1988 | Lambert | 358/310 |
| 4,734,764 | 3/1988 | Pacock et al. | 348/7 |
| 4,751,692 | 6/1988 | Giddings | 369/32 |
| 4,752,834 | 6/1988 | Koombes | 358/335 |
| 4,766,581 | 8/1988 | Korn et al. | 369/30 |
| 4,797,742 | 1/1989 | Sugiyama et al. | 358/141 |
| 4,814,871 | 3/1989 | Keesen et al. | 358/133 |
| 4,814,883 | 3/1989 | Perine et al. | 358/133 |
| 4,829,372 | 5/1989 | McCalley et al. | 348/7 |
| 4,888,638 | 12/1989 | Bohn | 358/84 |
| 4,947,264 | 8/1990 | Narusawa | 358/337 |
| 4,951,155 | 8/1990 | Andrews | 358/342 |
| 4,963,995 | 10/1990 | Lang | 358/335 |
| 4,974,085 | 11/1990 | Campbell et al. | 358/181 |
| 5,027,400 | 6/1991 | Baji et al. | 380/20 |
| 5,029,014 | 7/1991 | Lindstrom | 358/342 |
| 5,045,940 | 9/1991 | Peters et al. | 358/143 |
| 5,053,862 | 10/1991 | Phillips et al. | 348/549 |
| 5,057,932 | 10/1991 | Lang | 358/335 |
| 5,060,068 | 10/1991 | Lindrtrom | 358/185 |
| 5,067,015 | 11/1991 | Combridge et al. | 358/133 |
| 5,073,821 | 12/1991 | Juri | 358/133 |
| 5,099,319 | 3/1992 | Esch et al. | 358/86 |
| 5,115,310 | 5/1992 | Takano et al. | 358/84 |
| 5,119,188 | 6/1992 | McCalley et al. | 455/4.1 |
| 5,133,079 | 7/1992 | Ballantyne et al. | 455/4.1 |
| 5,182,640 | 1/1993 | Takano | 358/86 |
| 5,255,091 | 10/1993 | Lyon et al. | 358/140 |
| 5,267,351 | 11/1993 | Reber et al. | 395/600 |
| 5,305,438 | 4/1994 | MacKay et al. | 395/164 |
| 5,309,528 | 5/1994 | Rosen et al. | 382/58 |
| 5,355,450 | 10/1994 | Garmon et al. | 348/722 |

FOREIGN PATENT DOCUMENTS

| | | | |
|---|---|---|---|
| A-0443993 | 8/1991 | European Pat. Off. | H04H 1/00 |
| 0449552 | 10/1991 | European Pat. Off. | 348/9 |
| WO91/06182 | 5/1991 | WIPO | H04N 7/01 |
| WO93/12613 | 6/1991 | WIPO | H04N 7/133 |
| WO93/12481 | 6/1993 | WIPO | G06F 5/06 |

OTHER PUBLICATIONS

B. Killion, "Ad Insertion Systems", Technical Data & Application Information, pp. VT-3 –VT-9.

(List continued on next page.)

*Primary Examiner*—John K. Peng
*Assistant Examiner*—John W. Miller
*Attorney, Agent, or Firm*—Wolf, Greenfield & Sacks, P.C.

[57] ABSTRACT

Digital audio/video insertion and broadcast system. The system takes audio/video source information and digitizes, compresses and stores the information. The storage is in a random access medium such as magnetic or optical disks. Playing apparatus decompresses the information and regenerates an analog signal. Patching apparatus inserts the regenerated analog signal into a broadcast or cable channel at preselectable times. Editing apparatus may be provided for editing a stored video file prior to playing.

32 Claims, 1 Drawing Sheet

OTHER PUBLICATIONS

Funkschau, vol. 62, No. 14, Jun. 1990, Munchen De, pp. 60–62, XP134715 U. Berger "Computer an den Schaltstellen".

"Coding of Color Television Signals Using a Modified M-Transform for 34 MBit/s–Transmission," Frequenz, vol. 38, No. 10, Oct. 1984, in German with English translation, pp. 238–243.

"Reducing Financial Aliasing in HDTV Production," C.A. Pantuso, Better Video Images, 23rd Annual SMPTE Conf., 3–4 Feb. 1989, San Francisco, CA, pp. 157–169.

Chantelou et al., "Adaptive Transform Coding of HDTV Pictures," Signal Processing of HDTV, Proceedings of the Second Int'l Workshop on Signal Processing of HDTV, L'Aquila, 29th Feb.–Mar. 2, 1988, pp. 231–238, 1984.

W. Paik, "Digicipher TM–All Digital, Channel Compatible, HDTV Broadcast System," IEEE Transactions on Broadcasting, vol. 36, No. 4, Dec. 1990, (New York, U.S.), pp. 245–254.

Frank Davidoff, "The All–Digital Television Studio", SMPTE Journal, vol. 89, No. 6, Jun. 1980, pp. 445–449.

5,715,018

DIGITAL ADVERTISEMENT INSERTION SYSTEM

BACKGROUND OF THE INVENTION

This invention relates to audio/video advertisement insertion and broadcast systems.

Automated advertisement insertion systems have been developed to insert audio/video advertisements into interruptions in broadcast or cable programming. Examples of prior art advertisement insertion systems are disclosed in U.S. Pat. No. 4,724,491 to Lambert and U.S. Pat. No. 5,029,014 to Lindstrom. Lambert employs multiple video tape recorders for advertisement insertion and Lindstrom teaches a system employing laser disks for inserting messages in an order different from the order in which they are recorded in the laser disk. Neither system digitizes, compresses and stores the original analog source material nor do the prior art systems permit editing of a particular commercial segment as part of the audio/video advertisement insertion or broadcast process. Nor can they control a broadcast system.

SUMMARY OF THE INVENTION

The digital audio/video advertisement insertion and broadcast system of the invention includes analog audio/video source information and apparatus adapted for digitizing, compressing and storing the information. Playback apparatus is provided to decompress the information and regenerate an analog signal. Patching apparatus controls the broadcast and inserts the regenerated analog signal into a broadcast or cable channel at preselectable times. A preferred embodiment further includes editing apparatus interconnected with the digitizing, compressing and storing apparatus for editing the digitized information before it is played and inserted into a communications channel. In this specification the term advertisement insertion is meant to include any material (including video, audio, or both) regardless of length, inserted or broadcast in a communication channel.

DESCRIPTION OF THE PREFERRED EMBODIMENT

The digital audio/video advertisement insertion and broadcast system of the invention will be described with reference to a paradigm cable television system, typical of a present day installation, having 20 channels. The system of the invention, nevertheless, is applicable to any broadcast system. The cable system's headend, main office and studios may or may not be located at a common site. In the present invention, video and audio source material is digitized. The video portion of the information is compressed via a system in accordance with the still picture compression standard proposed by the Joint Photographic Experts' Group (JPEG) to a user selected degree of image resolution. JPEG chips are available from C-Cubed of Milpitas, Calif. The stored digital audio/video (DAV) files are 60 fields per second, full motion, full resolution video and stereo audio files. Suitable JPEG compression technology is disclosed in copending U.S. patent application Ser. No. 07/866,829 of Paul D. Garmon, Robert A. Gonsalves, Patrick D. O'Connor and Stephen J. Reber entitled Improved Media Composer filed Apr. 10, 1992, and assigned to the assignee of the present application. The DAV files may be stored on suitable magnetic media or optical disks. The DAV files containing the digitized audio and video information of differing resolutions may be stored, sequenced and replicated in any order at any time. Because the information is stored as fries, the files can be readily edited to accommodate last minute changes before ad insertion. Stereo audio signals are digitized in any number of standard digital audio formats, e.g., 44.1 KHz, 44 KHz, 48 KHz, etc. as an integral part of each DAV file. Optionally, stereo audio signals may be stored at left-plus-right and left-minus-right channels so as to freely integrate DAV program flies into both stereo and monaural channels. The DAV files also contain file identification and tracking data for verification of air play.

Figure 1:
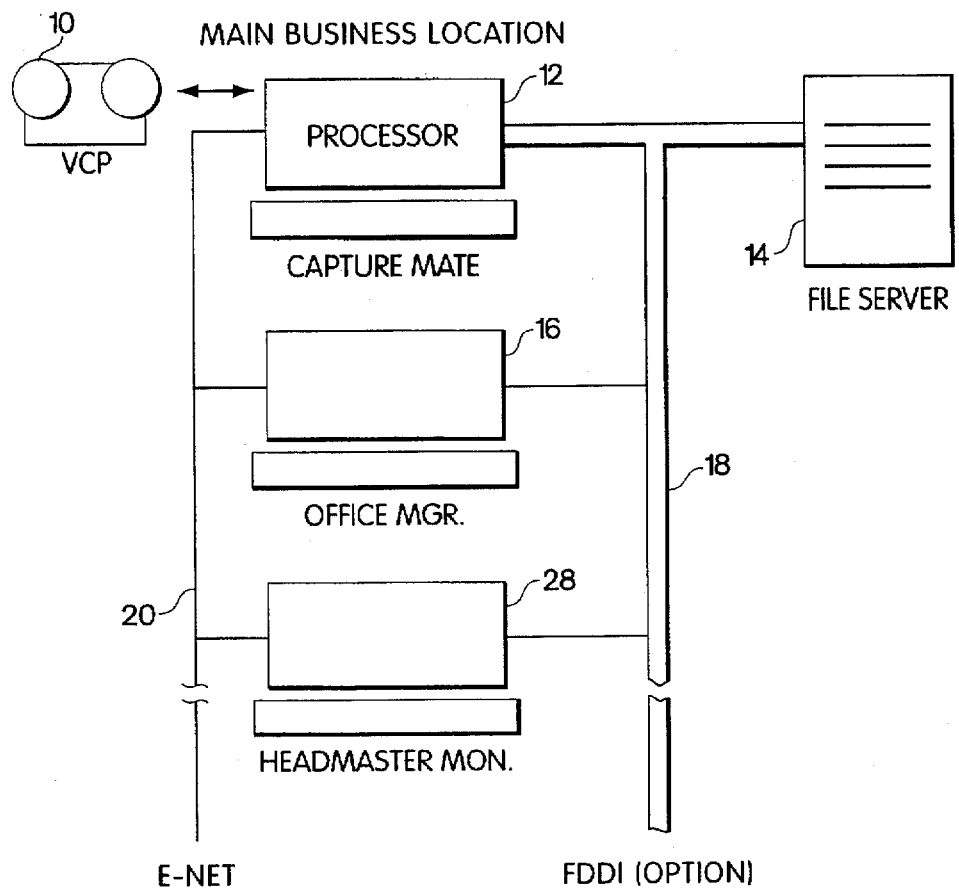
FIG. 1 is a schematic illustration of a digital audio/video advertisement insertion and broadcast system at a main business location.

With reference to FIG. 1, the hardware at a cable operator's main business location includes a video cassette player 10 which includes the analog video and audio information. This information is received by processing equipment 12 interconnected with a file server 14. The processor 12 (referred to as a Capture Mate) includes a general purpose computer to support the digital audio/video insertion system operating software, a robust, high-speed magnetic hard drive or drives, support for a digital audio/video network, telephone and other analog signal interconnects, techniques for digitizing audio/video program signals into DAV files, apparatus for regenerating analog signals from DAV files, and apparatus for remotely controlling analog VCRs for digitizing incoming material or sending analog or digital feed for insertion into the cable system or broadcast systems. The file server 14 is typically a free standing extensive mass storage device employing either magnetic or optical storage media. The processor 12 normally supports and operates the office manager 16 portion of the insertion or broadcast system software. The office manager 16 software is typically responsible for digitizing, using conventional techniques, new program material from analog sources, handling associated traffic instructions, and generating channel insertion logs, performance affidavits, invoices and related functions. A network 18 is a digital audio/video file distribution network and a network 20 is a command and control network such as Ethernet.

Figure 2:
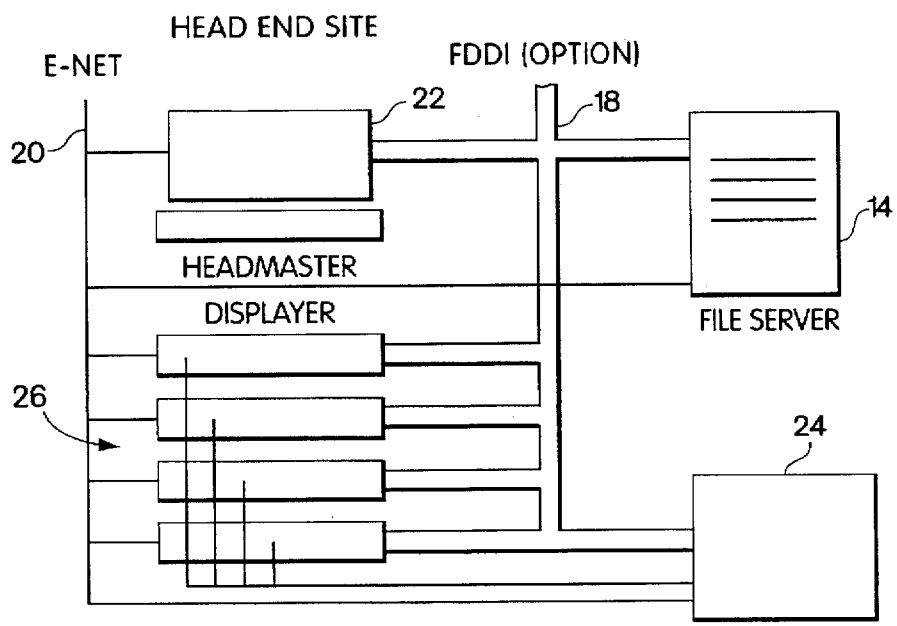
FIG. 2 is a schematic illustration of a digital audio/video advertisement insertion and broadcast system at a headend site or local broadcast site.

As shown in FIG. 2, the headend site includes a Headmaster station 22 which supports and operates a program manager portion of the insertion system software. The program manager software's primary function is the coordination of all insertion events within the insertion system. The program manager assigns insert events and advances DAV files and related audio/video signal matrix switcher 24 instructions to available players 26 via the DAV network 18. The program manager software also gathers operation and performance data for further processing via the office manager 16 software and technical maintenance logs and diagnostics. The Headmaster station 22 generally includes the same physical hardware as the processor 12.

The DAV network 18 is the main digital interconnect, uniting the office manager software of the processor 12 with the Headmaster station 22's program manager, archival media service, the player array 26, the matrix switcher 24 and associated peripherals. While the matrix switcher 24 can be manually operated remotely via the DAV network, note that the switcher 24's primary insert operations are not conducted over the network. These operations are conducted via a separate, dedicated link from the player array 26. The digital insertion system player array 26 includes minimally of a computer, a small, fast access hard drive for short term DAV file storage, matrix switcher software, switcher 24 control and analog signal interconnects, and a card for decompressing and processing DAV fries and replicating or regenerating real time analog audio/video signals. It is preferred that the insertion system include several players.

The switcher 24 is a digitally controlled audio/video signal matrix switcher. Sources into the matrix switcher 24 are analog audio, video and control signals coming from cable network feeds, video cassette players and the player array 26. Destinations from the switcher 24 are outgoing cable channels, analog video cassette recorders and digitizing systems. Signal routing commands for the switcher 24 are normally provided by the players 26 via Ethernet 20 via vertical interval command signals (VICS) added to the player 26's outgoing video. Additional routing commands may come from the program manager software in the Headmaster station 22 or from the office manager 16. As with most routing systems, the matrix switcher 24 is a key component of the ad insertion or broadcast installation. Thus, it is designed for high reliability with redundant paths and power.

In the smallest ad insertion system or broadcast installations a less expensive primary/secondary player routing scheme may be substituted for the matrix switcher 24. In larger cable systems where the business office and headend are often different sites, the processor station 12 and the Headmaster station 22 are generally installed in separate locations. A digital two-way link, optionally via the cable system itself or an Ethernet, integrates the processor 12 and file server 14 into the DAV network as a remote auxiliary Headmaster station 22. The option of identical, mirrored file archiving at two different sites provides for a high degree of data protection.

Connecting the outside world to a digital audio/video insertion and broadcast system may be accomplished via normal modems or Ethernet for traffic instructions and correspondence. DAV ties may be transmitted from elsewhere to a processor 12 site via overland T1 or T3 service or other medium high-speed digital transmission schemes. Like analog video tapes, portable digital media such as optical disks in both 5.25- and 12-inch formats or spooling tapes can also be forwarded to the processor 12 site. The processor 12 station joins Ethernet or the DAV network only periodically to perform routine file maintenance tasks or act as an auxiliary Headmaster. Thus, the separate processor 12 location also acts as a locally supervised insertion system gateway to ensure the data integrity of the local insertion or broadcast system. Incoming DAV files may be viewed, verified and modified locally, migrated from temporary storage to the primary DAV file servers 14 and made available to the insertion or broadcast system.

The processor 12 and its office manager software may spend most of a typical workday off the Ethernet 20 and/or the DAV network 18, maintaining only a remote monitoring terminal on the Ethernet to follow Headmaster station 22 and player 26 operations. A remote monitor terminal 28 may also be connected to the Headmaster station 22 by conventional phone lines. This allows office manager 16 to monitor and control Headmaster 22 operations in the event that the high-speed digital connections fail Most of the time, the processor 12 and its office manager software 16 are occupied generating new DAV files and traffic schedules, conducting billing and other related business operations. In large installations, the office manager 16 software may reside and operate in separate work stations, leaving processor 12 free to create new DAV files. The processor 12 normally joins the Ethernet or DAY network only to update and unify the local and Headmaster 22 file servers 14.

The mass storage technologies used in the DAV file servers 14 do not necessarily have to provide for real time DAV file replication or instantaneous random access. Incoming audio/video programs are digitized initially at the processor station 12 and stored to its smaller, faster magnetic drive. This new DAV file is subsequently sent to both main archive media file servers 14 at less than real time data rate if necessary. During normal insertion system operation, DAV files and accompanying timing and matrix switch 24 instructions can be loaded from the file server through the Headmaster 22 along the DAV network 18 to the available players 26, again at lower than real time rates if necessary.

Upon insertion or broadcast play back, the players 26 then replicate or regenerate the DAV files as real time analog signals from their smaller, faster on-board hard drives. This approach makes the use of slower, massive storage schemes very viable. A bank of six 12-inch digital optical disks providing 30 G bytes serves as a practical storage medium for the main file servers 14. Digital spooling tapes become practical for long-term storage of infrequently used DAV files.

Small audio/video ad insertion or broadcast system configurations for a number of insert or broadcast channels may be continuously operated with only one combined master station. Thus, the processor 12 and the Headmaster 22 can be the same physical station, and the office manager 16 and program manager functions can share the master platform. The smallest system, designed for single channel operation also incorporates the player 26 functions as well. Redundant DAV file storage and media management is still an optional capability of smaller systems. Player 26 platforms may be assigned to perform as an auxiliary Headmaster/program manager. Thus, reliable system operation is easily maintained with a minimum of additional hardware components. Since the present insertion or broadcast system is constructed on a modular bases, additional players 26 may be added over time.

Having now described the system of the invention, its operation will now be discussed. The execution of an insert or broadcast event is as follows. The system selects an upcoming event from the master traffic schedule for insertion or broadcast. It then calculates the total storage space required for all DAV files included in the insertion event. Whenever more than one DAV file is to be inserted as a single event, all DAV files for the event are sent to one player 26. There, they are segued seemlessly in real time from the player's drive. The program manager seeks and assigns an available player 26 to execute the event, and verifies that there is sufficient space in the players hard drive to store the event's DAV files. The DAV files, timing data, and a matrix switcher 24 insertion instructions are sent to the player array 26. The timing data consists of the actual precise time from the Readmaster 22's calibrated master clock, the scheduled time for the insert if it is to be locally time triggered, the total running time of the DAV files, and the scheduled duration of the insertion as scheduled by the network. The insert control instructions contain event trigger source and routing information to operate the switcher 24 for switching the network program signal and the players 26. Once a player 26 receives its DAV files, timing data and insert control instructions, it performs its assigned work without any further instructions. The system logs the DAV files and associated control data as being copied to the player 26 and the event as being delegated to the ready player 26 for execution.

Once assigned the player 26 immediately orders the switcher 24 to provide a video sample of the incoming network program feed scheduled to be preempted by the player's assigned insert event. If insert trigger and timing data are provided in the incoming programs vertical interval, the player 26 can decode and respond instantaneously as there is no need for any preroll time as in prior art systems. This signal also serves as a genlock reference for the player's on board sync generator. The player is genlocked to this video source.

At the precise insert time, a player 26 optionally may disable the full genlock function, and allow its on board sync generator to remain locked only to the incoming 3.58 MHz color frequency. This technique maintains a tight, but indirect horizontal and vertical sync phase to the reference during the actual insertion event. This performance option facilitates vertical integral transitions to/from the insertions while providing high system isolation from any incoming program sync disruptions. Sync disruptions cannot adversely affect player 26 service during the insert event. Thus, video frame stores, processors and other signal conditioning hardware is minimized. The player array 26 then instructs the matrix switcher 24 to switch the destination channel from the network program feed to its analog output. The player 26 seemlessly plays and segues all the DAV files scheduled for insertion in the event. At the end of the insert event, the player orders the matrix switcher 24 to switch the destination channel back to the original program feed and switch off its incoming reference video feed. Optionally, the player 26 can insert DAV file tracking and other verification data into its output video vertical interval for detection and signal verification after the matrix switch has occurred.

The player 26 verifies locally that its DAV files were executed properly, and logs which files were played. This information is maintained in its own performance journal. The player 26 releases the disk space for new DAV files, and updates its performance journal. When the program manager is available, the player 26 informs the program manager via this journal that events have been properly executed. The program manager records the properly executed events into its master performance journal. The insert event and related activity is now completed.

DAV files present within the players 26 are not edited together as in traditional analog video tape. They remain independent files as duplicated from the DAV file server 14, and may be played in any order any time. Thus, to modify an event already assigned to a player 26, the program manager simply sends any new DAV files needed for the event and then sends the new set of event timing data and instructions. Some of the players 26 may be further equipped with an audio/video input signal digitizing circuit card. This option allows the remote generation of DAV files at the headend from any incoming program source switched to these players by the matrix switcher. This provides the insertion system with digital program capture and time shifting capabilities. Program length is ideally limited by the player's available hard disk space. In larger systems players may be assigned as groups and staggered by the program manager to digitize longer programs in segments. The input circuit card equipped player is assigned to each capture event by the program manager in the same manner as a normal insert event. Again, once necessary event timing and switch control data are provided by the program manager the player will perform the capture function independently. Once a player is loaded with its event and ready to perform the insertion, as a secondary task it verifies that is has more disk space available. It sends the program manager its current disk map of existing files and space for evaluation. The program manager determines the player's capacity to handle more assignments and accept more DAV files for subsequent insertion events.

The program manager continues converting the master traffic log into player assignments and loading insertion events as far in advance as the aggregate storage and routing abilities of all the players can support. Since the actual insertion event operating commands are distributed to the players along with the DAV files, both the Headmaster/ program manager and the backup office manager and all DAV file servers may be temporarily taken out of service. In short, the DAV network 18 may be shut down entirely. The programmed players continue to function normally and independently, directly controlling the matrix switcher 24 and inserting their events until all on board DAV files and insertion instructions are executed.

Currently, JPEG compression schemes available from Avid Technology of Burlington, Massachusetts, deliver full resolution 60-field images at data rates ranging between 40 and 50K bytes per frame. The data value used throughout this disclosure is 50K bytes per frame. This rate translates into full motion images occupying about 1.5M bytes per second of storage. Digital stereo audio requires about an additional 200K bytes per second, for a conservative total storage requirement of 1.8M bytes per second or 108M bytes per minute for total storage on a 5 G byte optical disk side of about 46 real time minutes. As MPEG-II compression schemes become viable there is an anticipated 3-to-1 compression performance improvement resulting in 138 minutes of real time broadcast quality programs stored within a 5 G byte disk. The overall DAV network traffic is also lowered to about one-third using MPEG-II methods. This results in typical real time rate DAV file transfers at 600–700K bytes per second.

The operating character of the DAV network 18 changes very substantially as multiple DAV files can now be shipped along the DAV network in real time, decompressed at the player and air played in real time.

An important aspect of the present invention is the editing capability in conjunction with ad insertion. Because the material to be inserted is stored in DAV files, the contents of the files may be readily edited to change program content. A media composer from Avid Technology of Burlington, Mass., can be utilized to edit the information stored in a DAV file. Importantly, such editing or modification is accomplished with no analog degradation or it can be used to send quickly assembled stories, for example, fast breaking events, directly out over a cable system.

As MPEG-II and other compression methods come into use, the matrix switch 24 will evolve into a broader analog and digital signal path controller, including JPEG and MPEG-II decoders and digital format transcoders that can be switched into pathways and employed by the switch to provide unified signal outputs to different channels.

What is claimed is:

1. Digital advertisement insertion system comprising:
    an analog source of motion video information;
    apparatus adapted for digitizing, compressing and storing the motion video information in a computer data file such that upon decompression broadcast quality motion video information is obtained;
    editing apparatus for editing the stored motion video information;
    playing apparatus that decompresses the edited stored motion video information to obtain broadcast quality motion video information and regenerates an analog signal, the playing apparatus including a synchronization generator to provide synchronization of the analog signal to a broadcast signal during insertion; and patching apparatus for inserting the regenerated analog signal into a broadcast channel at preselectable times.

2. The system of claim 1 further comprising editing apparatus intereconnected with the digitizing, compressing and storing apparatus for editing the digitized information.

3. A system of claim 1 wherein the playing apparatus comprises an array of players and the patching apparatus comprises a digitally controlled signal matrix switcher.

4. The system of claim 3 wherein the patching apparatus controls a broadcast channel.

5. The system of claim 1 wherein the compressing apparatus includes a JPEG chip, video board and bus apparatus to accommodate 60-field per second full-motion, full-resolution video.

6. The system of claim 1 wherein the apparatus for digitizing, compressing and storing employs magnetic disks.

7. The system of claim 1 wherein the apparatus for digitizing, compressing and storing comprises optical storage disks.

8. The system of claim 1 further including a digital interconnection network interconnecting the digitizing, compressing and storing apparatus, the playing apparatus and the patching apparatus.

9. The system of claim 1 further including means for editing a channel insertion log.

10. The system of claim 1 wherein the playing apparatus verifies locally that its files were executed and logs which files were played.

11. A system of claim 1 wherein the advertisement information is audio information.

12. A system of claim 1 wherein the advertisement information is video information.

13. A system of claim 1 wherein the advertisement information is audio and video information.

14. A method for digital advertisement insertion, comprising the steps of:

receiving motion video information from an analog source;

digitizing, compressing and storing the received motion video information in a computer data file such that upon decompression, broadcast quality motion video information is obtained;

selecting and editing at least a portion of the stored motion video information;

decompressing the selected and edited portion of the stored motion video information to obtain broadcast quality motion; and regenerating an analog signal from the selected and edited portion of the stored motion video information;

inserting the regenerated analog signal in place of a broadcast signal on a channel at a predetermined time; and providing synchronization of the regenerated analog signal to the broadcast signal.

15. A broadcasting system using sequences of digital still images to represent motion video, comprising:

means for inserting a signal representing motion video information in place of a broadcast signal on a broadcast channel at a predetermined time, and wherein the broadcast channel transmits the motion video information at a field per second rate;

means for providing synchronization of the signal representing motion video information to the broadcast signal;

a randomly-accessible computer-readable medium for digitally storing in a data file compressed image data for a sequence of digital still images, including an image corresponding to each field of the motion video information to be transmitted in the broadcast channel, such that upon decompression, broadcast quality motion video information is obtained; and a computer including means for editing the sequence of digital still images, means for accessing the sequence at the predetermined time, for decompressing the sequence to obtain broadcast quality motion video information and for generating the signal to be inserted into the broadcast channel from the accessed sequence.

16. The broadcasting system of claim 15, further comprising and editing system for enabling a user to edit the sequence of digital still images.

17. The broadcasting system of claim 15, wherein the broadcast channel transmits video information at 60 fields per second and the sequence of digital still images includes an image for each field of video information to be transmitted by the broadcast channel.

18. The broadcasting system of claim 15, wherein the medium is overwritable.

19. The broadcasting system of claim 18, wherein the medium is a magnetic disk.

20. The broadcasting system of claim 15, wherein the digital images stored on the means for storing are compressed, and wherein the means for generating the signal to be inserted into the broadcast channel includes means for decompressing the stored images.

21. A broadcast insertion system for inserting an input motion video signal into a broadcast signal at a predetermined time, the broadcast signal having an embedded synchronization signal, the broadcast insertion system comprising:

a computer readable and rewriteable random access medium that provides a data file containing a sequence of digital still images defining the input motion video signal;

an editing apparatus having means for accessing the data file, for displaying motion video information using the sequence of digital still images and means for editing the sequence of digital still images; and a playing apparatus having a first input coupled to the medium to receive the sequence of digital still images defining the input motion video signal, having a second input to receive the synchronization signal, and having an output that provides the input motion video signal at the predetermined time, the playing apparatus including means for generating the input motion video signal from the sequence of digital still images and a synchronization generator that synchronizes the input signal to the synchronization signal.

22. The broadcast insertion system of claim 21, wherein the synchronization generator provides indirect vertical and horizontal synchronization of the input signal to the broadcast signal using the color frequency signal.

23. A method for inserting an input motion video signal into a broadcast signal at a predetermined time, the broadcast signal having an embedded synchronization signal, the input motion video signal being synchronized by a synchronization generator, the method comprising steps of:

receiving a data file on a computer readable and rewriteable random access medium containing a sequence of digital still images defining the input signal;

editing the sequence of digital still images;

generating the input motion video signal from the edited sequence of digital still images;

receiving the broadcast signal;

locking the synchronization generator to the synchronization signal before the predetermined time;

inserting the generated input motion video signal into the broadcast signal at the predetermined time:

disabling the locking of the synchronization generator to the synchronization signal after the predetermined time; and locking the synchronization generator to the broadcast signal.

24. A video insertion system for interrupting a first video signal being distributed on a channel of a video distribution system at a predetermined time and inserting a second video signal including frames of video information into the channel in place of the first program, the system comprising:

a randomly accessible, computer-readable and re-writable storage medium that stores a sequence of digital still images including an image corresponding to each frame of video information of the second video signal;

a receiver that receives the first video signal being distributed on the channel;

a transmitter, coupled to the receiver, that transmits one of the first and second video signals onto the channel from the insertion system in response to a control signal;

reading means for reading the sequence of digital still images from the storage medium;

video generating means, coupled to the reading means and to the transmitter, for generating the second video signal from the sequence of digital still images; and control means for generating the control signal such that the second video signal is transmitted from the transmitter at the predetermined time.

25. The insertion system of claim 24, wherein the first video signal includes a synchronization signal, and wherein the video generating means includes:

synchronization means for generating the second video signal synchronous with the synchronization signal; and data transfer control means for varying a data rate of transfer of the digital still images from the storage medium to the video generation means to account for variability of access times of reading the digital still images stored in the storage medium so that the second video signal is synchronous with the synchronization signal.

26. The insertion system of claim 24, further comprising an editing system for enabling a user to edit the sequence of digital still images.

27. The insertion system of claim 24, wherein the sequence of digital still images stored on the storage medium is compressed and wherein the video generating means includes means for decompressing the sequence of digital still images.

28. The insertion system of claim 24, wherein the second video signal has a video quality substantially similar to a video quality of the first video signal.

29. In a motion video insertion system having a randomly accessible, computer-readable and re-writable storage medium that stores a sequence of digital still images as a computer data file in a compressed form such that upon decompression broadcast quality motion video information is obtained, a method for interrupting at a predetermined time a first motion video signal being distributed on a channel of a video distribution system and inserting a second motion video signal including frames of motion video information onto the channel in place of the first program, wherein each of the frames of motion video information corresponds to one of the digital still images, the method comprising steps of:

receiving the first motion video signal being distributed on the distribution channel;

transmitting the first motion video signal over the distribution channel;

editing the sequence of digital still images;

reading and decompressing the edited digital still images from the storage medium to obtain broadcast quality motion video information;

generating the second motion video signal from the decompressed sequence of digital still images;

interrupting the transmission of the first motion video signal at the predetermined time; and transmitting the second motion video signal over the distribution channel.

30. The method of claim 29, wherein:

the step of receiving includes a step of receiving a synchronization signal of the first video signal;

the step of generating the second video signal includes a step of generating the second video signal synchronous with the first video signal; and the method further comprises a step of varying a data rate of transfer of the digital still images from the storage medium.

31. The method of claim 29, further comprising a step of editing the sequence of digital still images.

32. The method of claim 29, wherein the sequence of digital still images is compressed and the method further includes a step of decompressing the sequence of digital still images.

* * * * *

UNITED STATES PATENT AND TRADEMARK OFFICE
CERTIFICATE OF CORRECTION

PATENT NO. : 5,715,018

DATED : February 3, 1998

INVENTOR(S) : Peter J. Fasciano, et al.

It is certified that error appears in the above-identified patent and that said Letters Patent is hereby corrected as shown below:

Column 1, line 65, replace "C-Cubed" with --C-Cube Microsystems, Inc.--.

Column 2, line 4, replace "Improved Media Composer" with --Media Composer with Adjustable Source Material Compression--;

line 10, replace "fries" with --files--; and line 17, replace "flies" with --files--.

Column 3, line 3, delete "of";

line 6, replace "fries" with --files--;

line 40, replace "ties" with --files--; and line 63, replace "fail" with --fail.--.

Column 4, line 3, replace "DAY" with --DAV--; and line 49, replace "seemlessly" with --seamlessly--.

Column 5, line 17, replace "integral" with --interval--; and line 25, replace "seemlessly" with --seamlessly--.

UNITED STATES PATENT AND TRADEMARK OFFICE
CERTIFICATE OF CORRECTION

PATENT NO. : 5,715,018
DATED : February 3, 1998
INVENTOR(S) : Peter J. Fasciano, et al.

It is certified that error appears in the above-identified patent and that said Letters Patent is hereby corrected as shown below:

Column 7, line 8, replace "intereconnected" with --interconnected--.

Column 8, line 15, replace "and" with --an--.

Signed and Sealed this

Tenth Day of October, 2000

Attest:

Q. TODD DICKINSON

*Attesting Officer*  *Director of Patents and Trademarks*